United States Patent [19]

Asano et al.

[11] 4,346,535
[45] Aug. 31, 1982

[54] CAM GRINDING MACHINE

[75] Inventors: Hiroaki Asano, Chiryu; Hiroshi Ota; Kenji Yamakage, both of Kariya, all of Japan

[73] Assignee: Toyoda Koki Kabushiki Kaisha, Kariya, Japan

[21] Appl. No.: 167,034

[22] Filed: Jul. 9, 1980

[30] Foreign Application Priority Data

Jul. 13, 1979 [JP] Japan .................................. 54-89578

[51] Int. Cl.³ ............................................ B24B 19/12
[52] U.S. Cl. ............................. 51/101 R; 51/105 SP; 51/105 EC; 51/217 T; 279/1 D; 409/199
[58] Field of Search .......... 51/101 R, 103 C, 105 EC, 51/105 SP, 217 T, 237 R, 237 CS, 238 S, 326; 279/1 D, 1 DA, 1 DC, 77; 409/199, 200

[56] References Cited

U.S. PATENT DOCUMENTS

| 1,374,399 | 4/1921 | Shailor | 279/77 |
| 2,101,796 | 12/1937 | Green | 51/101 R |
| 2,220,490 | 11/1940 | Ott et al. | 51/105 SP |
| 2,328,251 | 8/1943 | Balsiger | 51/105 SP |
| 2,535,199 | 12/1950 | Day | 279/1 D |
| 2,553,178 | 5/1951 | Day | 279/1 D |
| 2,565,430 | 8/1951 | Hohwart et al. | 279/1 D |
| 2,832,601 | 4/1958 | Mann | 279/1 D |
| 2,926,471 | 3/1960 | Bricker | 51/105 SP X |
| 3,191,952 | 6/1965 | Morawski | 279/1 D |
| 3,528,202 | 9/1970 | Happel | 51/101 R X |
| 3,864,879 | 2/1975 | Naismith | 51/101 R |

Primary Examiner—Stephen G. Kunin
Assistant Examiner—Robert P. Olszewski
Attorney, Agent, or Firm—Oblon, Fisher, Spivak, McClelland & Maier

[57] ABSTRACT

In a cam grinding machine, a first diaphragm chuck is provided on a spindle rotatably supported on a rocking table for clamping one journal portion of a cam shaft and a second diaphragm chuck is provided on a support spindle rotatably and slidably supported by a tailstock in coaxial alignment with the spindle for clamping another journal portion of the cam shaft. Accordingly, cam portions of the cam shaft are ground with journal portions of the cam shaft being used as a reference.

4 Claims, 5 Drawing Figures

CAM GRINDING MACHINE

BACKGROUND OF THE INVENTION

1. Field of the Invention

The present invention relates to cam grinding machines for grinding a cam shaft and, more particularly, to a cam grinding machine provided with a pair of chucks for supporting journal portions at opposite ends of the cam shaft.

2. Description of the Prior Art

In a conventional method of grinding a cam shaft, center bores are first machined on opposite ends of the cam shaft. Journal portions of the cam shaft are then machined by a cutting tool and subsequently ground by a grinding wheel by using the center bores as a reference. Thereafter, as shown in FIG. 1, the cam shaft is supported by center members 3 and 4 of a headstock 1 and a tailstock 2 in a cam grinding machine, and a key member 5 is engaged with a key way formed on the cam shaft, whereby cam portions C of the cam shaft are ground in accordance with the profiles of master cams.

However, when journal portions are ground with some deviation relative to the center bores in the preceding machining step, the cam portions are also ground with some deviation relative to the journal portions because of the use of the center bores as a reference. Furthermore, the cam portions may be ground with some angular phase error relative to one another because of the existence of a backlash between the key member and the key way.

In order to reduce the number of machining processes which had been performed in the conventional method of finishing the cam shaft, it has been considered to grind unfinished journal portions in a rough grinding operation and a subsequent fine grinding operation by a centerless grinding machine without using a cutting tool and a center support. However, even if this method can reduce the machining processes for finishing the journal portions, it is impossible to thereafter finish the cam portions by the cam grinding machine using the center support.

SUMMARY OF THE INVENTION

It is an object of the present invention to provide an improved cam grinding machine capable of grinding cam portions of a cam shaft with high accuracy, even if journal portions of the cam shaft are deviated from center bores or a cam shaft has no center bores.

Another object of the present invention is to provide an improved cam grinding machine provided with a pair of chucks, preferably diaphragm chucks for supporting journal portions at opposite ends of the cam shaft to eliminate any deviation of cam portions relative to the journal portions.

Briefly, according to the present invention, these and other objects are achieved by providing a cam grinding machine for grinding a plurality of cam portions of a cam shaft, as mentioned below. A rocking table is swingably supported on a traverse table and rotatably supports a spindle. A master cam shaft is mounted on the spindle and provided with a plurality of master cams having the same cam profiles as the plurality of cam portions of the cam shaft. A tailstock is mounted on the rocking table and rotatably and slidably supports a support spindle in coaxial alignment with the spindle. First chuck means are provided on the spindle for clamping one journal portion of the cam shaft. Second chuck means are provided on the support spindle for clamping another journal portion of the cam shaft. Means are provided for rotating the spindle.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENT

Figure 2:
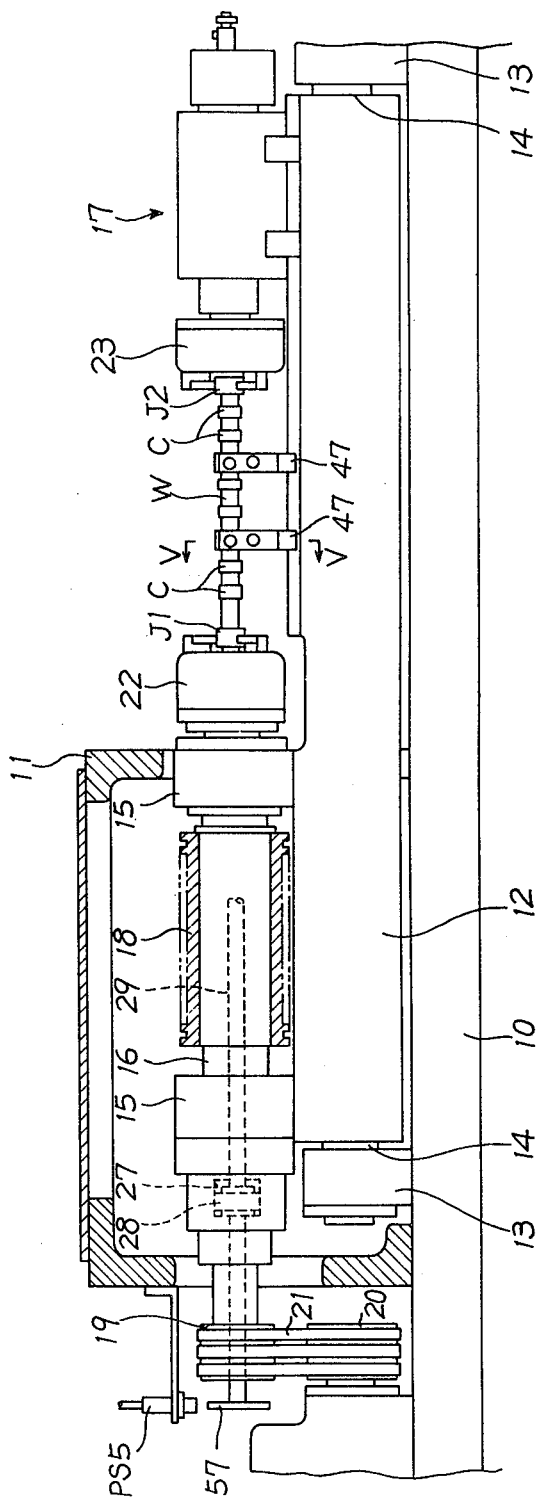
FIG. 2 is a front view, partly in section, of a portion of a cam grinding machine according to the present invention.

Referring now to the drawings, wherein like reference numerals or characters refer to identical or corresponding parts throughout the several views, and more particularly to FIG. 2, there is shown a traverse table 10 of a cam grinding machine according to the present invention. A head stock housing 11 is mounted on the traverse table 10. A pair of support members 13 are also mounted on the traverse table 10 to swingably support a rocking table 12 through a shaft 14. On one upper end of the rocking table 12, a spindle 16 is rotatably supported within the head stock housing 11 through a pair of support members 15. On the other upper end of the rocking table 12, a tailstock 17 is fixedly mounted in opposed relationship with the spindle 16. A tubular master cam shaft 18 is keyed on the spindle 16 and is provided with a plurality of master cams having the same cam profiles as a plurality of cams C of a cam shaft W to be ground. One of the master cams is adapted to be aligned with and held in contact with a follower roller through a swing arm and a spring (not shown) in a well known manner so that the rocking table 12 and the spindle 16 are swung about the shaft 14 in accordance with the profile of the master cam. The spindle 16 has secured to its rear end a pulley 19 which is drivingly connected to a pulley 20 through belts 21. The pulley 20 is drivingly connected to a drive motor, not shown. The spindle 16 and the tailstock 17 are respectively provided with diaphragm chucks 22 and 23 to respectively support journal portions J1 and J2 at opposite ends of the cam shaft W.

Figure 3:
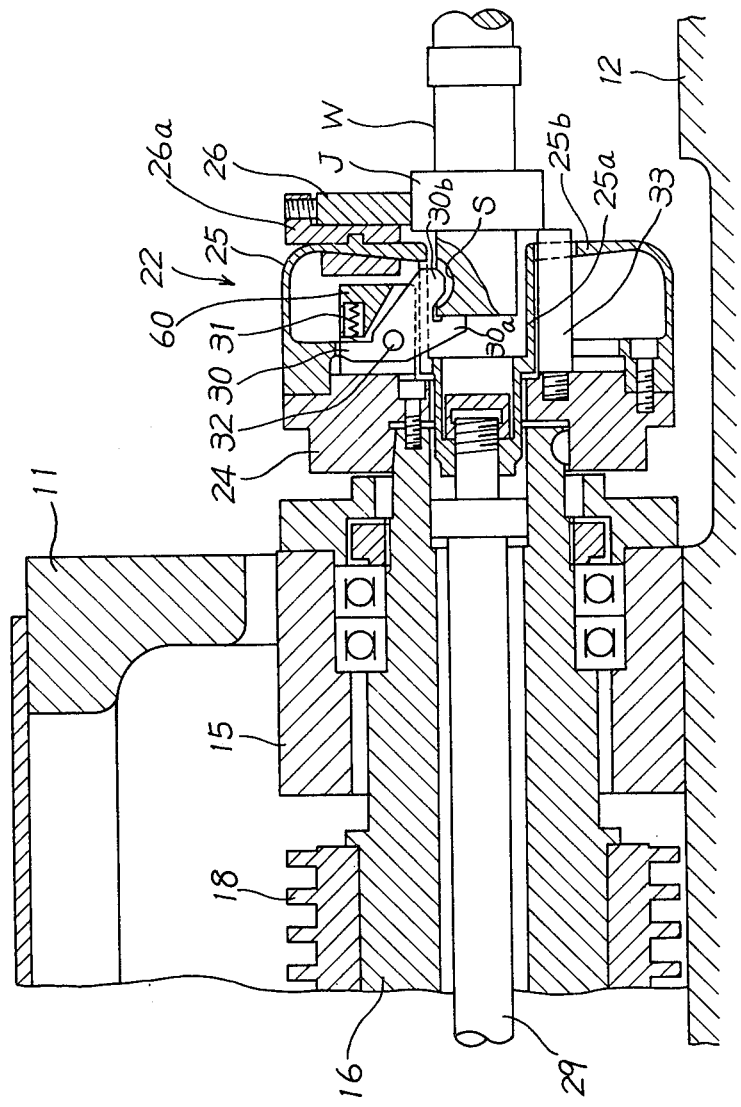
FIG. 3 is an enlarged sectional view of a diaphragm chuck provided at a headstock.

The detailed construction of the diaphragm chuck 22 provided on the spindle 16 is hereinafter described with reference to FIG. 3. At the forward end of the spindle 16 is secured a chuck body 24 for rotation therewith, to which a substantially cup-shaped resilient diaphragm 25 is secured. The diaphragm 25 is provided with a cylindrical hub portion 25a at its central portion which is extended from the end wall 25b toward the open end. A plurality of jaw bases 26a (one of which is shown) are fixed to the front face of the end wall 25b of the diaphragm 25 in angularly spaced relationship therearound. A jaw 26 is threaded into each of the jaw bases 26a to be adjustable in a radial direction of the diaphragm 25 for resiliently clamping the journal portion J1 of the cam shaft W.

Into the rearward end of the spindle 16 is formed a hydraulic actuator 27 (shown in FIG. 2) which comprises a piston 28 slidably received in a cylinder chamber formed in the spindle 16 and a piston rod 29 connected to the piston 28. The piston rod 29 extends centrally through the spindle 16 and is fixedly connected to the bottom of the hub portion 25a of the diaphragm 25. Accordingly, when the piston rod 29 is moved to the left, as viewed in FIG. 3, the hub portion 25a is also moved to the left so that the front face 25b of the diaphragm 25 is deflected rearwardly to move the jaws 26 radially inwardly, thereby clamping the journal portion J1 of the cam shaft W. On the other hand, when the piston rod 29 is moved to the right, the front face 25b of the diaphragm 25 is deflected forwardly to move the jaws 26 radially outwardly, thereby unclamping the journal portion J1 of the cam shaft W.

A support block 60 is secured to the front face of the chuck body 24 within the diaphragm 25 and pivotably supports a key member 30 within an opening thereof through a pin 32. A spring 31 is interposed within the support block 60 to urge one end of the key member 30 in a counterclockwise direction, as viewed in FIG. 3. The other end of the key member 30 extends into a central opening of the hub portion 25a through an opening formed on the side wall of the hub portion 25a and is bifurcated to form an engaging face 30a to be engaged with the end face of the cam shaft W and a key portion 30b to be inserted into a key way S of the cam shaft W. Accordingly, when the cam shaft W is inserted into the central opening of the hub portion 25a and into abutting engagement with the engaging face 30a, the key member 30 is pivoted in a clockwise direction against the force of the spring 31 to insert the key portion 30b thereof into the key way S of the cam shaft W, to thereby angularly orient the cam shaft W relative to the spindle 16. A stop pin 33 is threaded into the front face of the chuck body 24 and extends forwardly through an opening formed at the front face 25b of the diaphragm 25 to be engaged with the shoulder of the journal portion J1 of the cam shaft W for axial positioning of the cam shaft W.

The detailed construction of the diaphragm chuck 23 provided on the tailstock 17 is hereinafter described with reference to FIG. 4. On the rocking table 12 is mounted a tailstock housing 34 into which a pair of bushings 35 are securedly inserted from the opposite ends. A support sleeve 36 is slidably received in the pair of bushings 35 and is formed on the outer periphery thereof with a piston 38 which is slidably received in a cylinder chamber 37 defined between the pair of bushings 35. Accordingly, supply of pressurized fluid into the cylinder chamber 37 causes the support sleeve 36 to move axially. A support spindle 40 is rotatably supported in the support sleeve 36 through a pair of bearings 39 in coaxial relationship with the spindle 16. At the front end of the support spindle 40 is secured the diaphragm chuck 23 which comprises a substantially cup-shaped resilient diaphragm 41. A plurality of jaw bases 42a (one of which is shown) are fixed to the front face 41a of the diaphragm 41 in angularly spaced relationship therearound. A jaw 42 is radially adjustably threaded into each of the jaw bases 42a for resiliently clamping the journal portion J2 of the cam shaft W.

Into the rearward end of the support spindle 40 is formed a hydraulic actuator 43 which comprises a piston 44 slidably received in a cylinder chamber formed in the support spindle 40 and a piston rod 45 connected to the piston 44. The piston rod 45 extends centrally through the support spindle 40 and is fixedly connected to the central portion of the front face 41a of the diaphragm 41. Accordingly, when the piston rod 45 is moved to the right, as viewed in FIG. 4, the front face 41a of the diaphragm 41 is deflected rearwardly to move the jaws 42 radially inwardly, thereby clamping the journal portion J2 of the cam shaft W. On the other hand, when the piston rod 45 is moved to the left, the front face 41a of the diaphragm 41 is deflected forwardly to move the jaws 42 radially outwardly, thereby unclamping the journal portion J2 of the cam shaft W. A bushing 46a is secured to the front end of the support spindle 40 to slidably support the piston rod 45. A positioning pin 46 is threaded into the front face of the bushing 46a and extends forwardly through an opening formed at the front face 41a of the diaphragm 41 to be engaged with the shoulder of the journal portion J2 of the cam shaft W for axial positioning of the cam shaft W.

Figure 1:
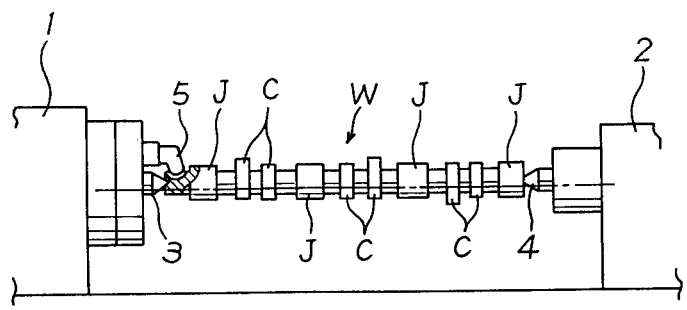
FIG. 1 is a front view of a portion of a conventional cam grinding machine.
Figure 5:
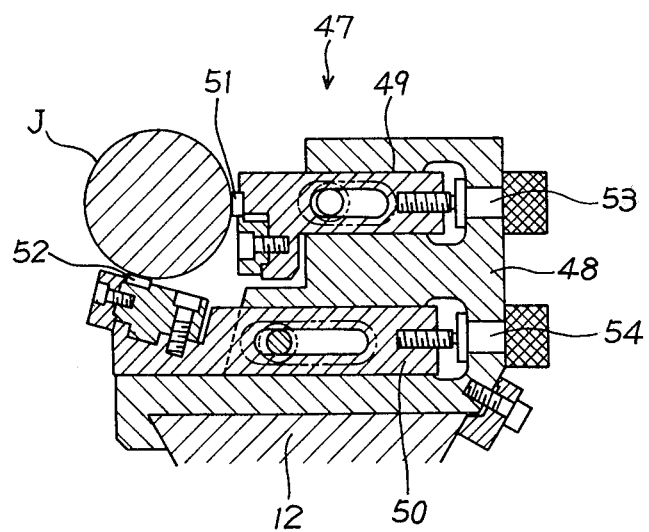
FIG. 5 is an enlarged sectional view taken along the lines V—V in FIG. 2, showing the detail of a rest apparatus.

A pair of identical rest apparatus 47 are arranged between the diaphragm chucks 22 and 23, one of which is hereinafter described with reference to FIG. 5. A rest housing 48 is slidably adjustably mounted on the rocking table 12 and fixed in position by clamping bolts, not numbered. A pair of rest shafts 49 and 50 are received in the rest housing 48 to be slidable in a horizontal direction and fixedly support at the respective ends thereof by side and lower shoe members 51 and 52 to be engaged with the side and lower portions of the journal portion J3 of the cam shaft W. Adjusting screw shafts 53 and 54 are rotatably but non-slidably supported by the rest housing 48 and threaded into the rest shafts 49 and 50 to make an adjustment of the side and lower shoe members 51 and 52 relative to the journal portion J3 of the cam shaft W. After completion of adjustment of the shoe members 51 and 52 relative to the journal portion J3, the rest shafts 49 and 50 are fixed to the rest housing 48 by means of clamping bolts, not numbered.

Figure 4:
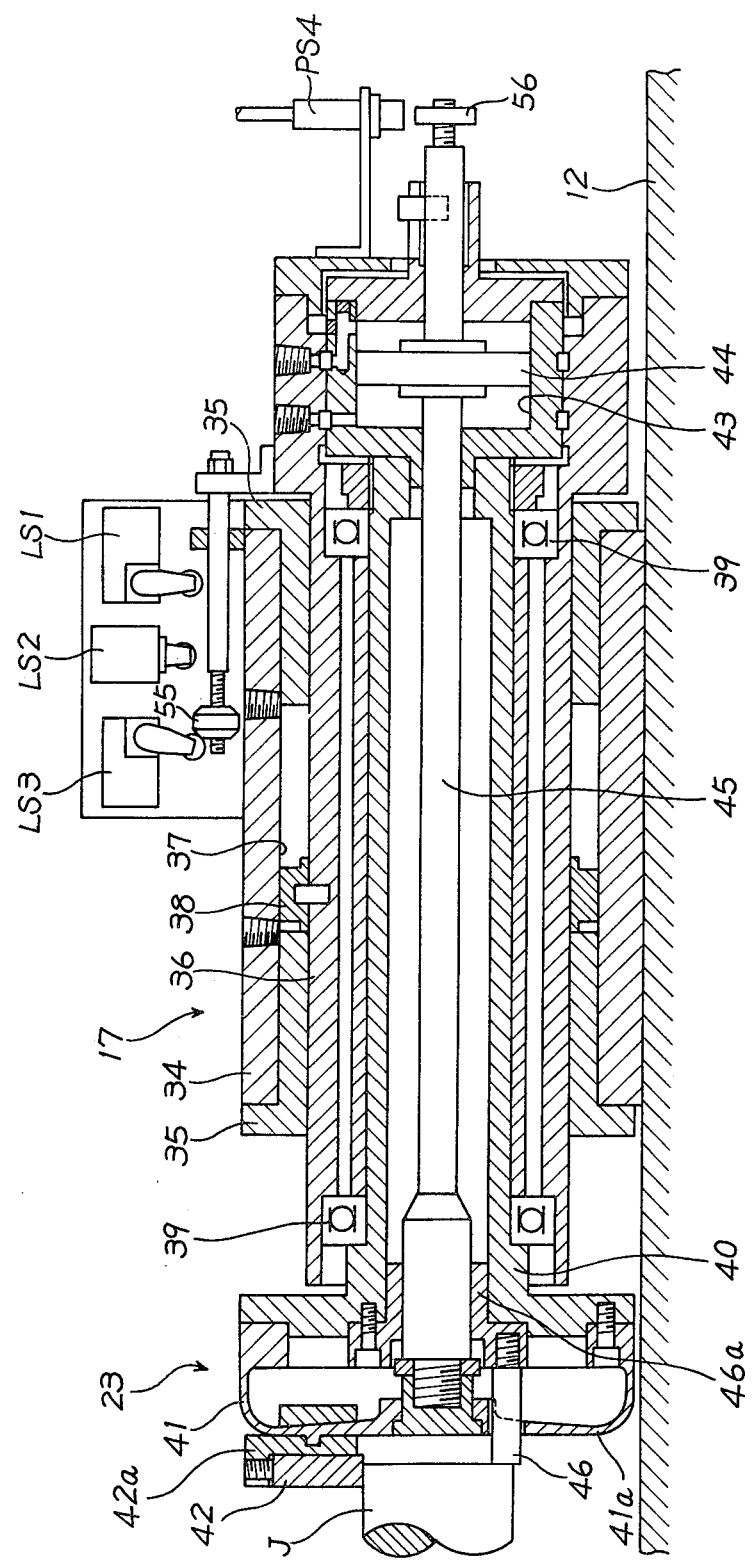
FIG. 4 is an enlarged sectional view of a tailstock showing another diaphragm chuck.

Referring to FIG. 4, limit switches LS1 and LS3 are mounted on the tailstock housing 34 through a plate member to be actuated by a dog 55 secured to the support sleeve 36 to confirm rearward, intermediate and forward positions of the support spindle 40. A proximity switch PS4 is secured to the support sleeve 36 to be actuated by a dog 56 connected to the piston 44 to confirm the clamping operation of the diaphragm chuck 23. Referring to FIG. 2, a proximity switch PS5 is secured to the headstock housing 11 to be actuated by a dog 57 connected to the piston 28 to confirm the clamping operation of the diaphargm chuck 22.

The operation of the cam grinding machine according to the present invention is hereinafter described. The drawings show the states where the cam grinding operation is completed on the cam shaft W supported by the diaphragm chucks 22 and 23 and rotation of the spindle 16 is stopped. Under these conditions, when pressurized fluid is supplied into the left chamber of the hydraulic actuator 27 to advance the piston 28 to the right, the front face 25b of the diaphragm 25 is deflected forwardly to cause the jaws 26 to unclamp the journal portion J1 of the cam shaft W. This unclamping operation of the diaphragm chuck 22 causes the proximity switch PS5 to be deactivated, which then causes pressurized fluid to be supplied into the left of the cylinder chamber 37 to retract the piston 38. Accordingly, the support sleeve 36 and the support spindle 40 are retracted with the diaphragm chuck 23 clamping the journal portion J2 of the cam shaft W to draw out the journal portion J1 from the diaphragm chuck 22. When the piston 38 is retracted to the intermediate position, the limit switch LS2 is actuated by the dog 55. With the limit switch LS2 being actuated, the supply of pressurized fluid into the cylinder chamber 37 is stopped to discontinue retraction of the piston 38 and the diaphragm chuck 23, and pressurized fluid is supplied into the right chamber of the hydraulic actuator 43 to advance the piston 44 so that the diaphragm chuck 23 unclamps the journal portion J2 of the cam shaft W. This unclamping operation of the diaphragm chuck 23 causes the proximity switch PS4 to be deactivated, which then causes pressurized fluid to again be supplied into the left of the cylinder chamber 37 to further retract the diaphragm chuck 23 with the cam shaft W remaining supported on the rest apparatus 47. When the limit switch LS1 is actuated by the dog 55, the supply of pressurized fluid to the left of the cylinder chamber 37 is stopped.

Subsequently, the finished cam shaft W left on the rest apparatus 47 is unloaded by a workpiece transfer device, not shown, and an unfinished cam shaft W is loaded on the rest apparatus 47 by the transfer device. Thereafter, pressurized fluid is admitted into the right of the cylinder chamber 37 to advance the piston 38. With the piston 38 being advanced, the positioning pin 46 is moved into abutting engagement with the shoulder of the journal portion J2 to move the journal portion J1 into the diaphragm chuck 22 of the spindle 16. Simultaneously, pressurized fluid is admitted into the left chamber of the hydraulic actuator 43 to retract the piston 44, so that the diaphragm chuck 23 clamps the journal portion J2 of the cam shaft W.

Axial movement of the cam shaft W into the diaphragm chuck 22 causes the end face of the cam shaft W to engage with the engaging face 30a of the key member 30 to rotate the same in a clockwise direction. As a result, the key portion 30b of the key member 30 is inserted into the key way S to orient the cam shaft W relative to the spindle 16. However, when the key way S of the cam shaft W is not aligned with the key portion 30b, the key portion 30b cannot be inserted into the key way S and the axial movement of the cam shaft W is prevented by the engaging face 30a. Accordingly, the limit switch LS3 for confirming the forward position of the support spindle 40 is not actuated. In such a state, the spindle 16 is rotated at a lower speed by the drive motor, not shown, to permit the key portion 30b to be inserted into the key way S during its rotation. At this time, it is to be noted that the support spindle 40 is prevented from rotation due to the bearing resistance at the bearings 39 and the rotational friction of the piston 44 at the hydraulic actuator 43, so that the cam shaft W is also prevented from rotation. When the shoulder of the journal portion J1 is moved into abutting engagement with the stop pin 33, the limit switch LS3 is actuated by the dog 55 to confirm the completion of axial and angular positioning of the cam shaft W.

With the limit switch LS3 being actuated, pressurized fluid is admitted into the right chamber of the hydraulic actuator 27 to retract the piston 28 so that the diaphragm chuck 22 clamps the journal portion J1 of the cam shaft W. This clamping operaion of the diaphragm chuck 22 causes the proximity switch PS5 to be actuated by the dog 57, which then causes the drive motor, not shown, to be driven to rotate the spindle 16. When the spindle 16 is rotated, the spindle 16 and the rocking table 12 are swung about the shaft 14 in accordance with the profile of the master cam. Under these conditions, a grinding wheel, not shown, is advanced toward the cam shaft W to grind the cam C in accordance with the profile of the master cam.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A cam grinding machine for grinding a plurality of cam portions of a cam shaft comprising:

a traverse table;

a rocking table swingably supported on said traverse table;

a spindle rotatably supported on said rocking table;

a master cam shaft mounted on said spindle and provided with a plurality of master cams having the same cam profiles as said plurality of cam portions of said cam shaft;

a tailstock mounted on said rocking table;

a support spindle rotatably and slidably supported by said tailstock in coaxial alignment with said spindle;

a chuck body secured to said spindle for rotation therewith;

a substantially cup-shaped resilient diaphragm secured to said chuck body at the open end thereof and provided with a cylindrical hub portion at its central portion which is extended from the end wall of said diaphragm toward the open end of said diaphragm;

a plurality of jaw bases fixed to the end wall of said diaphragm in angularly spaced relationship therearound;

a jaw threaded into each of said jaw bases for adjustment in a radial direction of said diaphragm;

a hydraulic actuator formed in said spindle, a piston rod thereof extending centrally through said spindle and connected to said hub portion of said diaphragm for deflecting said diaphragm to cause said jaws to clamp one journal portion of said cam shaft;

a support block secured to said chuck body within said diaphragm and formed with an opening;

a key member pivotably supported within said opening;

a spring interposed within said support block to bias one end of said key member;

the other end of said key member being bifurcated to form an engaging face to be engaged with the end face of said cam shaft and to form a key portion to be inserted into a key way of said cam shaft;

chuck means provided on said support spindle for clamping another journal portion of said cam shaft; and means for rotating said spindle.

2. A cam grinding machine as claimed in claim 1, further comprising:

a stop pin secured to said chuck body and extending through an opening formed at the end wall of said diaphragm to be engaged with a shoulder portion of said one journal portion of said cam shaft.

3. A cam grinding machine for grinding a plurality of cam portions of a cam shaft comprising:
- a traverse table;
- a rocking table swingably supported on said traverse table;
- a spindle rotatably supported on said rocking table;
- a master cam shaft mounted on said spindle and provided with a plurality of master cams having the same cam profiles as said plurality of cam portions of said cam shaft;
- a chuck body secured to said spindle for rotation therewith;
- a first substantially cup-shaped resilient diaphragm secured to said chuck body at the open end thereof;
- a first plurality of jaw bases fixed to the end wall of said first diaphragm in angularly spaced relationship therearound;
- a first jaw threaded into each of said first jaw bases for adjustment in a radial direction of said first diaphragm;
- a first hydraulic actuator formed in said spindle, a first piston rod thereof extending centrally through said spindle and connected to said first diaphragm for deflecting said first diaphragm to cause said first jaws to clamp one journal portion of said cam shaft;
- means for rotating said spindle;
- a tailstock housing mounted on said rocking table;
- a support sleeve slidably received in said tailstock housing;
- means for axially moving said support sleeve;
- a support spindle rotatably supported in said support sleeve in coaxial relationship with said spindle;
- a second substantially cup-shaped resilient diaphragm secured to said support spindle at the open end thereof;
- a second plurality of jaw bases fixed to the end wall of said second diaphragm in angularly spaced relationship therearound;
- a second jaw threaded into each of said second jaw bases for adjustment in a radial direction of said second diaphragm;
- a second hydraulic actuator formed in said support spindle, a second piston rod thereof extending centrally through said support spindle and connected to said second diaphragm for deflecting said second diaphragm to cause said second jaws to clamp another journal portion of said cam shaft;
- rest means mounted on said rocking table between said first and second diaphragms for supporting still another journal portion of said cam shaft;
- a support block secured to said chuck body within said first diaphragm and formed with an opening;
- a key member pivotably supported within said opening;
- a spring interposed within said support block to bias one end of said key member; and
- the other end of said key member being bifurcated to form an engaging face to be engaged with the end face of said cam shaft and to form a key portion to be inserted into a key way of said cam shaft.

4. A cam grinding machine as claimed in claim 3, further comprising:
- a positioning pin secured to said support sleeve and extending through an opening formed at the end wall of said second diaphragm to be engaged with a shoulder portion of said another journal portion of said cam shaft.

* * * * *